| United States Patent [19] | [11] Patent Number: 4,886,862 |
| Kuwamura et al. | [45] Date of Patent: Dec. 12, 1989 |

[54] RESIN COMPOSITION

[75] Inventors: Shinichi Kuwamura, Izumi-ohtsu; Masataka Ooka, Nara, both of Japan

[73] Assignee: Dainippon Ink and Chemicals, Inc., Tokyo, Japan

[21] Appl. No.: 282,907

[22] Filed: Dec. 12, 1988

Related U.S. Application Data

[63] Continuation of Ser. No. 916,330, Oct. 7, 1986, abandoned.

[30] Foreign Application Priority Data

Oct. 9, 1985 [JP] Japan .................................. 60-223479

[51] Int. Cl.$^4$ .............................................. C08F 16/24
[52] U.S. Cl. ..................................... 526/247; 526/249; 526/279; 526/250; 526/254; 526/255; 525/326.2; 525/326.3; 525/326.4; 525/326.5
[58] Field of Search ............... 526/247, 249, 279, 250, 526/254, 255; 525/326.2, 326.3, 326.4, 326.5

[56] References Cited

U.S. PATENT DOCUMENTS

| | | | |
|---|---|---|---|
| 2,945,003 | 7/1960 | Olson | 526/249 |
| 3,714,214 | 1/1973 | Hermes | 260/448 |
| 3,755,252 | 8/1973 | Buning et al. | 526/279 |
| 3,775,386 | 11/1973 | Citron | 526/247 |

FOREIGN PATENT DOCUMENTS

| | | | |
|---|---|---|---|
| 34107 | 2/1982 | Japan . | |
| 136662 | 8/1983 | Japan . | |
| 102961 | 6/1984 | Japan . | |
| 102962 | 6/1984 | Japan . | |
| 1422299 | 1/1976 | United Kingdom | 526/279 |

*Primary Examiner*—Joseph L. Schofer
*Assistant Examiner*—Peter D. Mulcahy
*Attorney, Agent, or Firm*—Sherman and Shalloway

[57] ABSTRACT

An ordinary temperature-curable resin composition comprising (A) a hydrolyzable silyl group-containing fluoroolefin copolymer obtained by polymerizing a monomeric mixture comprising a fluoroolefin as an essential component in the presence of a hydrolyzable silyl group-containing compound, (B) a curing catalyst, and (C) an organic solvent.

31 Claims, No Drawings

RESIN COMPOSITION

This application is a continuation of application Ser. No. 916,330 filed Oct. 7, 1986, now abandoned.

This invention relates to a novel and useful ordinary temperature-curable resin composition as a solution. More specifically, this invention relates to a solution-type resin composition having moisture curability at ordinary temperature comprising a fluoroolefin copolymer, a curing catalyst and an organic solvent.

The composition of this invention can be used, for example, as a paint for household electrical appliances, an exterior paint for buildings, tiles and precoated metals (PCM), various automobile paints such as an enamel, a metallic paint or a clear paint, a surface protective film for glass and ceramic products, or as a sealing resin composition.

Crosslinkable solution-type fluorine resins heretofore known are of the type in which a base polymer containing hydroxyl groups introduced therein is cured at ordinary temperature or under heat by using a curing agent having reactivity with the hydroxyl groups, namely a polyisocyanate resin, a melamine resin, etc., as described, for example, in Japanese laid-open patent publications Nos. 34107/1982, 136662/1983, 102961/1984, and 102962/1984.

Cured films so obtained have much higher weatherability and chemical resistance than those obtained from conventional resin compositions such as a hydroxyl group-containing acrylic resin/polyisocyanate resin combination, a hydroxyl group-containing polyester resin/polyisocyanate resin combination, a hydroxyl group-containing acrylic resin/melamine resin combination or a hydroxyl group-containing polyester resin/melamine resin combination. But since the base polymer contains hydroxyl groups and the composition contains a polyisocyanate resin or a melamine resin in an equivalent weight to the hydroxyl groups, these cured films cannot be said to have such a high level of weatherability as can be "maintenance-free".

On the other hand, acrylic resins or polyether resins containing hydrolyzable silyl groups introduced thereinto are known, and the possibility of their use as a moisture-curable paint resin or a sealer resin has been studied in the art. Cured products of these hydrolyzable silyl group-containing resins have better weatherability than cured products of polyisocyanate resins or melamine resins, but their weatherability is still insufficient.

So far, no resin systems having such a high level of weatherability as can be maintenance-free have been obtained as yet.

The present inventors have made investigations on the basis of the thought that crosslinking by siloxane linkages derived from hydrolyzable silyl groups would bring about better weatherability than crosslinking by urethane linkages induced by a polyisocyanate group or ether linkages induced by a melamine resin, and that a fluorine resin would bring about better weatherability than acrylic resins or polyether resins. These investigations have led to the discovery that a fluoroolefin copolymer containing hydrolyzable silyl groups give a cured product having much better weatherability than do the aforesaid resin systems and that when a specific monomer is used together, no turbidity or haze occurs in the resulting resin solution and coated film, and the resulting coated film has high hardness.

According to this invention, there is provided an ordinary temperature-curable resin composition comprising (A) a hydrolyzable silyl group-containing fluoro-olefin copolymer obtained by polymerizing a monomeric mixture comprising a fluoroolefin as an essential component in the presence of a hydrolyzable silyl group-containing compound, (B) a curing catalyst, and (C) an organic solvent.

The hydrolyzable silyl group-containing fluoro-olefin copolymer (A) contains at least one, preferably at least two, hydrolyzable silyl groups per molecule, and can be produced, for example, by (1) copolymerizing a vinyl monomer containing a hydrolyzable silyl group and a fluoroolefin, (2) copolymerizing fluoroolefins in the presence of a chain transfer agent containing a hydrolyzable silyl group, or (3) copolymerizing fluoroolefins in the presence of a vinyl monomer containing a hydrolyzable silyl group and a chain transfer agent containing a hydrolyzable silyl group [the combination of the methods (1) and (2)].

The methods (1) and (3) are preferred in view of the efficiency of introducing the hydrolyzable silyl group and the curability of the resulting copolymer.

Examples of typical fluoroolefins used in this invention include
vinyl fluoride,
vinylidene fluoride,
trifluoroethylene,
tetrafluoroethylene,
chlorotrifluoroethylene,
bromotrifluoroethylene,
pentafluoropropylene,
hexafluoropropylene,
trifluoromethyl perfluorovinyl ether,
perfluoroethyl perfluorovinyl ether,
perfluoropropyl perfluorovinyl ether,
2,2,3,3-tetrafluoropropyl perfluorovinyl ether,
2,2,2-trifluoroethyl perfluorovinyl ether,
perfluorohexyl perfluorovinyl ether,
perfluorooctyl perfluorovinyl ether,
perfluorododecyl perfluorovinyl ether,
perfluorostearyl perfluorovinyl ether,
perfluorocyclohexyl perfluorovinyl ether, and
perfluorobutyl perfluorovinyl ether. Of these, vinyl
  fluoride, vinylidene fluoride, trifluoroethylene, tetra-
  fluoroethylene, chlorotrifluoroethylene, hexafluoro-
  propylene, and (per)fluoroalkyl perfluorovinyl ethers
  having 1 to 8 carbon atoms in the alkyl moiety are
  particularly preferred. These fluoroolefins may be
  used singly or in combination.

The suitable amount of the fluoroolefin used is 10 to 70% by weight, preferably 20 to 60% by weight, in view of the solubility of the copolymer (A) in the organic solvent (C) and the weatherability of a cured product obtained from the copolymer (A). The vinyl monomer containing a hydrolyzable silyl group used in the method (1) or (3) denotes a monomer containing a hydrolyzable functional silyl group such as a halosilyl, alkoxysilyl, acyloxysilyl, phenoxysilyl, mercaptosilyl, aminosilyl, iminoxysilyl or alkenyloxysilyl group and being represented by the following general formula

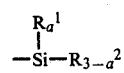

wherein $R^1$ represents a hydrogen atom or an alkyl, aryl or aralkyl group, $R^2$ represents a halogen atom or an alkoxy, acyloxy, phenoxy, mercapto, amino, iminoxy or alkenyloxy group, and a is an integer of 0, 1 or 2.

The alkoxysilyl, iminoxysilyl and alkenyloxysilyl groups are preferred because they do not evolve undesirable volatile components at the time of curing.

Typical examples of the hydrolyzable silyl group-containing vinyl monomer include
vinyltrimethoxysilane,
vinyltriethoxysilane,
vinyltripropoxysilane,
vinyltributoxysilane,
vinylmethyldimethoxysilane,
vinyldimethylmethoxysilane,
vinylmethyldiethoxysilane,
vinylethyldiethoxysilane,
vinyltris(beta-methoxyethoxy)silane,
vinyltris(beta-ethoxyethoxy)silane,
vinyltriisopropenyloxysilane,
vinyltriisobutenyloxysilane,
vinyltris(dimethyliminoxy)silane,
vinyltris(methylethyliminoxy)silane,
allyltrimethoxysilane,
trimethoxysilylethyl vinyl ether,
triethoxysilylethyl vinyl ether,
trimethoxysilylpropyl vinyl ether,
trimethoxysilylbutyl vinyl ether,
triethoxysilylpropyl vinyl ether,
methyldimethoxysilylethyl vinyl ether,
methyldimethoxysilylpropyl vinyl ether,
dimethylmethoxysilylpropyl vinyl ether,
triisopropenyloxysilylethyl vinyl ether,
triisopropenyloxysilylpropyl vinyl ether,
triisopropenyloxysilylbutyl vinyl ether,
triisobutenyloxysilylethyl vinyl ether,
triisobutenyloxysilylpropyl vinyl ether,
methyldiisopropenyloxysilylpropyl vinyl ether,
tris(dimethyliminoxy)silylethyl vinyl ether,
tris(dimethyliminoxy)silylpropyl vinyl ether,
tris(methylethyliminoxy)silylethyl vinyl ether,
tris(methylethyliminoxy)silylpropyl vinyl ether,
gamma-(meth)acryloyloxypropyltrimethoxysilane,
gamma-(meth)acryloyloxypropyltriethoxysilane, and
gamma-(meth)acryloyloxypropylmethyldimethoxysilane.

The vinylsilanes and vinyl ethers are especially preferred as the hydrolyzable silyl group-containing vinyl monomer in view of their copolymerizability with the fluoroolefins.

Typical examples of other copolymerizable vinyl monomers used together with the above monomer include vinyl esters of linear or branched aliphatic carboxylic acids such as vinyl acetate, vinyl propionate, vinyl butyrate, vinyl 2,2-dimethylpropanoate, vinyl 2,2-dimethylbutanoate, vinyl 2,2-dimethylpentanoate, vinyl 2,2-dimethylhexanoate, vinyl 2-ethyl-2-methylbutanoate, vinyl 2,2-diethylbutanoate, vinyl-2-ethyl-2-methylpentanoate, vinyl caproate, vinyl caprate, vinyl caprylate, vinyl laurate, vinyl stearate, a vinyl ester of $C_9$ Versatic acid [to be abbreviated hereinafter as vinyl Versatate ($C_9$)], vinyl Versatate ($C_{10}$), vinyl Versatate ($C_{11}$), and vinyl 3-chloro-2,2-dimethylpropanoate;

vinyl esters of alicyclic carboxylic acids such as vinyl cyclohexanecarboxylate, vinyl methylcyclohexanecarboxylate, vinyl tert-butylcyclohexanecarboxylate and vinyl cyclopentanecarboxylate; vinyl esters of aromatic carboxylic acids such as vinyl benzoate, vinyl p-tert-butylbenzoate and vinyl salicylate;

vinyl esters of aralkylcarboxylic acids such as vinyl phenylacetic acid and vinyl 4-methylphenylacetate;

hydroxyalkyl vinyl ethers such as 2-hydroxyethyl vinyl ether, 3-hydroxypropyl vinyl ether and 4-hydroxybutyl vinyl ether;

alkyl vinyl ethers such as methyl vinyl ether, ethyl vinyl ether, n-propyl vinyl ether, isopropyl vinyl ether, n-butyl vinyl ether, isobutyl vinyl ether, tertbutyl vinyl ether, n-hexyl vinyl ether, 2-ethylhexyl vinyl ether, n-octyl vinyl ether and lauryl vinyl ether;

cycloalkyl vinyl ethers such as cyclohexyl vinyl ether, methylcyclohexyl vinyl ether and cyclopentyl vinyl ether;

alpha-olefins such as ethylene, propylene and butene-1;

vinyl halides other than the aforesaid fluoroolefins, such as vinyl chloride and vinylidene chloride;

aromatic vinyl compounds such as styrene, alpha-methylstyrene and vinyltoluene;

allyl alcohol and allyl glycidyl ether;

mono- or di-esters of polybasic acids containing an unsaturated linkage, such as fumaric acid and maleic acid;

nitrogen-containing monomers such as (meth)acrylonitrile, (meth)acrylamide, N-methylol(meth)acrylamide and N-butoxymethyl(meth)acrylamide;

polybasic acids containing an unsaturated linkage and anhydrides thereof such as maleic acid or anhydride and itaconic acid or anhydride; and (meth)acrylic acid esters such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, hexyl (meth)acrylate, 2-ethylhexyl (meth)acrylate, lauryl (meth)acrylate, cyclohexyl (meth)acrylate, benzyl (meth)acrylate, 2-hydroxyethyl (meth)acrylate, 3-hydroxypropyl (meth)acrylate and (methyl)glycidyl (meth)acrylate.

Among these copolymerizable vinyl monomers, the vinyl esters of aliphatic carboxylic acids having a $C_4-C_{17}$, preferably $C_4-C_{10}$, tertiary alkyl group, the vinyl esters of alicyclic carboxylic acids, the vinyl esters of aromatic carboxylic acids, the vinyl esters of aralkylcarboxylic acids and the cycloalkylvinyl ethers are especially preferred in view of the solubility of the resulting copolymer (A) in the organic solvent (C) and the hardness of a cured product obtained from the composition of this invention. At least one vinyl monomer selected from the group consisting of these vinyl monomers may be used in an amount of 10 to 80% by weight based on the total weight of the monomers.

Preferably, an alkyl vinyl ether such as methyl vinyl ether, ethyl vinyl ether or butyl vinyl ether is used in an amount of 5 to 50% by weight based on the total weight of the monomers because it increases the polymerization conversion during preparation of the copolymer (A) and makes it possible to introduce the hydrolyzable silyl group efficiently and consequently to enhance the curability of the composition of this invention.

The chain transfer agent containing a hydrolyzable silyl group used in the method (2) or (3) serves to control the molecular weight of the copolymer as its inherent function and at the same time serves to introduce the hydrolyzable silyl group into the ends of the molecular chain of the fluoroolefin copolymer. Preferably, it is used in combination with a monomer containing the silyl group, namely in the method (2).

Typical examples of the hydrolyzable silyl group-containing chain transfer agent include gamma-mercaptopropyltrimethoxysilane, gamma-mercaptopropyltriethoxysilane, gamma-mercaptopropylmethyldimethoxysilane, gamma-mercaptopropylmethyldiethoxysilane, gamma-mercaptopropyltriisopropenyloxysilane and gamma-mercaptopropyltris(dimethyliminoxy)silane.

In view of the curability of the resulting copolymer (A) and the pot life of the composition of this invention, it is proper to use the hydrolyzable silyl group-containing vinyl monomer and the hydrolyzable silyl group-containing chain transfer agent in such amounts that the amount of the hydrolyzable silyl groups introduced is 0.05 to 3 moles, preferably 0.1 to 2 moles, per 1000 g of the resin solids.

The copolymerization is carried out by a batchwise, semi-continuous or continuous operation using a known technique such as bulk polymerization, or solution polymerization under pressure, in the presence of a radical initiator and as required, the chain transfer agent described above.

Examples of the radical initiator are diacyl peroxides such as acetyl peroxide or benzoyl peroxide; ketone peroxides such as methyl ethyl ketone peroxide or cyclohexanone peroxide; hydroperoxides such as hydrogen peroxide, t-butyl hydroperoxide or cumene hydroperoxide; dialkyl peroxides such as di-t-butyl peroxide or dicumyl peroxide; alkyl peroxy esters such as t-butyl peroxyacetate or t-butyl peroxypivalate; azo compounds such as azobisisobutyronitrile or azobisisovaleronitrile; and persulfates such as ammonium persulfate or potassium persulfate. If required, inorganic reducing agents such as sodium hydrogen sulfite or sodium pyrosulfite or organic reducing agents such as cobalt naphthenate or dimethylaniline may also be used.

The solution polymerization under pressure is particularly simple and convenient as a method of copolymerization to obtain the copolymer (A). Suitable solvents for use in the polymerization include, for example, hydrocarbons such as toluene, xylene, cyclohexane, n-hexane or octane; esters such as methyl acetate, ethyl acetate or butyl acetate; ketones such as acetone, methyl ethyl ketone, methyl isobutyl ketone, cyclohexanone or methyl amyl ketone; amides such as dimethylformamide or dimethylacetamide; alcohols such as methanol, ethanol, isopropanol, n-butanol, isobutanol, sec-butanol or ethylene glycol monoalkyl ethers; and mixtures of these. To improve the storage stability of the resulting copolymer, the use of solvents containing the alcohols is preferred.

Another group of solvents may be used singly or in combination with the aforesaid solvents in order to remove a tiny amount of water present in the reaction system. It includes, for example, trialkyl orthoformates such as trimethyl ortho-formate, triethyl orthoformate or tributyl ortho-formate; trialkyl orthoacetates such as trimethyl ortho-acetate, triethyl orthoacetate or tributyl ortho-acetate; trialkyl ortho-borates such as trimethyl ortho-borate, triethyl ortho-borate or tributyl ortho-borate; tetra(substituted)alkyl silicates such as tetramethyl silicate, tetraethyl silicate, tetrabutyl silicate, tetra(2-methoxyethyl) silicate or tetra(2-chloroethyl) silicate; di- or tri-alkoxysilanes such as methyltrimethoxysilane, dimethyldimethoxysilane, phenyltrimethoxysilane, ethyltrimethoxysilane, ethyldimethoxysilane or butyltrimethoxysilane; epoxy group-containing silane coupling agents such as gamma-glycidoxypropyltrimethoxysilane gamma-glycidoxypropyltriisopropenyloxysilane, gamma-glycidoxypropyltris(methylethyliminoxy)silane, gamma-glycidoxypropylmethyldimethoxysilane or beta-(3,4-epoxycyclohexyl)ethyltrimethoxysilane; partially hydrolyzed condensed products of the tetra(substituted)alkyl silicates and the di- or tri-alkoxysilanes; and mixtures of these.

To enhance the storage stability of the resulting solution of copolymer (A), it is preferred to use solvents containing the alcohols, tetra(substituted)alkyl silicates or partially hydrolyzed condensed products thereof, di- or tri-alkoxysilanes or partially hydrolyzed condensed products thereof, the ortho-formates, the ortho-acetates, the ortho-borates and the epoxy group-containing silane coupling agents.

If the polymerization solvent or the monomers used in the polymerization do not contain active hydrogen reactive with the isocyanate group, the polymerization may be carried out in the co-presence of an isocyanate compound such as benzenesulfonyl isocyanate, p-toluenesulfonyl isocyanate, phenyl isocyanate, p-chlorophenyl isocyanate, 2,4-toluene diisocyanate, m-xylylene diisocyanate or hexamethylene diisocyanate, preferably a monoisocyanate such as benzenesulfonyl isocyanate, p-toluenesulfonyl isocyanate, phenyl isocyanate or p-chlorophenyl isocyanate.

In the polymerization, various chain transfer agents such as laurylmercaptan, octylmercaptan, 2-mercaptoethanol or alpha-methylstyrene dimer may be used to control the molecular weight of the copolymer.

The suitable reaction temperature in the polymerization is in the range of $-20°$ C. to $130°$ C. The initial reaction pressure is in the range of 0.5 to 100 kg/cm$^2$, preferably 1 to 60 kg/cm$^2$.

The suitable number average molecular weight ($\overline{Mn}$) of the resulting copolymer (A) is 1,000 to 50,000, preferably 3,000 to 30,000.

Catalysts known and used in the hydrolysis or condensation of the hydrolyzable silyl group-containing fluoroolefin copolymer (A) may be used as the curing catalyst (B) constituting the composition of this invention. Typical examples of the curing agent include basic compounds such as butylamine, dibutylamine, hexylamine, t-butylamine, ethylenediamine, triethylamine, isophoronediamine, imidazole, lithium hydroxide, sodium hydroxide, potassium hydroxide or sodium methylate; metal-containing compounds such as tetraisopropyl titanate, tetrabutyl titanate, tin octoate, lead octoate, cobalt octoate, zinc octoate, calcium octoate, lead naphthenate, cobalt naphthenate, dibutyltin acetate, dibutyltin dioctoate, dibutyltin dilaurate or dibutyltin maleate; acidic compounds such as p-toluenesulfonic acid, trichloroacetic acid, phosphoric acid, mono- or di-alkyl esters of phosphoric acid, phosphoric acid esters of beta-hydroxyethyl (meth)acrylate, monoalkylesters of phosphorous acid or alkylphosphonic acids; vinyl polymers containing an acidic phosphate group; and vinyl polymers containing a sulfonic acid group.

The suitable amount of the curing catalyst (B) used is 0.001 to 10% by weight, preferably 0.01 to 5% by weight, based on the solids of the hydrolyzable silyl group-containing fluoroolefin copolymer (A).

The organic solvent (C) as an essential component of the composition of this invention may be any of those organic solvents which can dissolve or stably disperse the fluoroolefin copolymer (A), the curing catalyst (B) and other additives including pigments. Specific examples include the above-exemplified solvents used in the production of the copolymer (A), and silane coupling agents containing an amino group, a mercapto group or a double bond, such as gamma-aminopropyltrimethoxysilane, gamma-dimethylaminopropyltrimethoxysilane, gamma-mercaptopropyltrimethoxysilane, vinyltrimethoxysilane and gamma-(meth)acryloyloxypropyltrimethoxysilane.

If an epoxy group-containing silane coupling agent which acts concurrently as a solvent and a reactive diluent is used as the solvent (C), a cured product of the resulting composition of this invention has good adhesion to metals such as aluminum, aluminum alloys or stainless steel.

The composition of this invention may be obtained by using the three essential components (A), (B) and (C). It is possible to incorporate in the composition various additives such as pigments, other resins, levelling agents, antiflooding agents, antioxidants and ultraviolet absorbers.

Typical examples of the pigments are inorganic pigments such as titanium dioxide, calcium carbonate and carbon black and organic pigments such as phthalocyanine, quinacridone and azo pigments. There can also be used disperse pigments obtained by treating pigments with resins, as disclosed in Japanese laid-open patent publication No. 51753/1985.

The additive resins may be any of those resins usually employed in paints. Typical examples include (meth)acrylic resins which may contain styrene, polyester resins, alkyd resin, melamine-formaldehyde resins, polyisocyanate resins, epoxy resins, vinyl chloride resins (e.g., vinyl chloride/vinyl acetate copolymer), cellulosic resins (e.g., nitrocellulose or cellulose acetatebutyrate), ketone resins, petroleum resins, chlorinated products of polyolefins (e.g., polyethylene or polypropylene), alkoxysilane-modified resins such as those disclosed in Japanese laid-open patent publication No. 168625/1983, and fluorine resins obtained by polymerizing tetrafluoroethylene or chlorotrifluoroethylene, or copolymerizing it with another monomer copolymerizable with it.

The resulting ordinary temperature-curable resin composition which is curable at ordinary temperatures gives a cured film having very good weatherability by coating it on a substrate, and drying it at room temperature for several days or baking the coating at 60 to 150° C. for 1 to 30 minutes in a customary manner.

The following Referential Examples, Examples and Comparative Examples illustrate the present invention more specifically. Unless otherwise specified, all parts and percentages in these examples are by weight.

REFERENTIAL EXAMPLES 1-4

Preparation of the fluoroolefin copolymer (A):

A 2000 ml stainless steel pressure tube was charged with 900 g of methyl isobutyl ketone (MIBK), 80 g of n-butanol, 20 g of methyl ortho-formate and 7 g of tert-butyl peroxypivalate together with vinyltrimethoxysilane (VSi), trimethoxysilylpropyl vinyl ether (VESi), gamma-mercaptopropyltrimethoxysilane (gamma-MPTMSi), ethyl vinyl ether (EVE), cyclohexyl vinyl ether (CHVE), vinyl Versatate (C$_9$) (VV-9) or vinyl benzoate (VBZ) in the amount indicated in Table 1, and cooled to −70° C. with a dry ice/methanol bath. Nitrogen gas was blown into the pressure tube to replace the air in it.

Then, liquefied hexafluoropropylene (HFP) or chlorotrifluoroethylene (CTFE) was introduced in the amount indicated in Table 1, and the tube was sealed.

When tetrafluoroethylene (TFE) was used, a pressure tube equipped with a valve was used, and the aforesaid compounds were charged in the same way. Then, TFE was introduced under pressure from a TFE bomb. After closing the valve, the pressure tube was weighed.

The pressure tube was put in a water bath kept at 60° C., and the reaction was carried out for 16 hours. The product was diluted with xylene to a nonvolatile content (N.V.) of 40%, and its properties were measured. The results are summarized in Table 1.

TABLE 1

| | | Referential Example | | | |
|---|---|---|---|---|---|
| | | 1 | 2 | 3 | 4 |
| Amounts charged | HFP | 500 | 300 | | |
| | TFE | | | 200 | 200 |
| | CTFE | | | 300 | 300 |
| | VSi | 190 | 190 | | 190 |
| | VESi | | | 250 | |
| | γ-MPTMSi | | | 10 | |
| | EVE | 100 | | 100 | |
| | CHVE | | 100 | | |
| | VV-9 | 200 | | 140 | 340 |
| | VBZ | | 200 | | |
| Properties | N.V. (%) | | | 40 | |
| | G.C. | <1 | <1 | <1 | <1 (slightly turbid) |
| | Functional (*1) group content | 1.34 | 1.34 | 1.27 | 1.34 |
| | $\overline{M}n$ | 7,000 | 8,000 | 8,500 | 7,000 |
| | Copolymer designation | A-1 | A-2 | A-3 | A-4 |

Note:
(*1) This indicates the calculated amount of hydrolyzable silyl groups introduced per 1000 g of resin solids, and its unit is "moles/1000 g of resin solids".

REFERENTIAL EXAMPLE 5

Preparation of the fluoroolefin copolymer (A):

The same polymerization as in Referential Examples 1-4 was carried out except that 100 g of vinyl fluoride, 300 g of CTFE, 150 g of n-butyl vinyl ether, 400 g of vinyl 2,2-dimethylpropanoate and 50 g of vinyltriisopropenyloxysilane were used as the monomers to be copolymerized, and 200 g of MIBK, 20 g of methanol and 30 g of tetraethyl silicate was used as the solvent. The product was diluted with xylene to an N.V. of 60% to give a solution of the desired copolymer (A) having a Gardner color (G.C.) of 1, and an $\overline{M}n$ of 15,000 [to be abbreviated as copolymer (A-5)].

REFERENTIAL EXAMPLE 6

Preparation of the fluoroolefin copolymer (A):

The same polymerization as in Referential Examples 1-4 was carried out except that 100 g of vinylidene fluoride, 300 g of TFE, 150 g of EVE, 400 g of vinyl 2,2-dimethylbutanoate and 50 g of vinyltriethoxysilane were used as the monomers to be copolymerized, and 200 g of MIBK, 20 g of ethanol and 30 g of gamma-glycidoxypropyltrimethoxysilane are used as the solvent. The product was diluted with xylene to an N.V. of 60% to give a solution of the desired copolymer (A) having a G.C. of less than 1, and an $\overline{M}n$ of 16,000 [to be abbreviated as copolymer (A-6)].

REFERENTIAL EXAMPLE 7

Preparation of the fluoroolefin copolymer (A):

The same polymerization as in Referential Examples 1–4 was carried out except that 300 g of CTFE, 100 g of trifluoroethylene, 100 g of n-hexyl vinyl ether, 50 g of EVE, 50 g of vinyl acetate, 300 g of VV-9, 50 g of vinyl Versatate ($C_{11}$) and 50 g of trimethoxysilylethyl vinyl ether were used as the monomers to be copolymerized and 200 g of MIBK, 30 g of n-butanol and 20 g of beta-(3,4-epoxycyclohexyl)ethyltrimethoxysilane were used as the solvent. The product was diluted with xylene to an N.V. of 60% to give a solution of the desired copolymer (A) having a G.C. of less than 1 and an $\overline{Mn}$ of 15,000 [to be abbreviated as copolymer (A-7)].

REFERENTIAL EXAMPLE 8

Preparation of the fluoroolefin copolymer (A):
Referential Example 7 was repeated except that 300 g of CTFE, 100 g of trifluoromethyl perfluorovinyl ether, 150 g of EVE, 350 g of vinyl 2,2-dimethylpentanoate and 100 g of vinyltris(beta-methoxyethoxy)silane were used as the monomers to be copolymerized. There was obtained a solution of the desired copolymer (A) having an N.V. of 60%, a G.C. of less than 1 and an $\overline{Mn}$ of 14,000 [to be abbreviated as copolymer (A-8)].

REFERENTIAL EXAMPLE 9

Preparation of the fluoroolefin copolymer (A):

Referential Example 7 was repeated except that 350 g of CTFE, 50 g of perfluoropropyl perfluorovinyl ether, 150 g of methyl vinyl ether, 350 g of vinyl 2-ethyl-2-methylbutanoate and 100 g of vinyltris(dimethyliminoxy)silane were used as the monomers to be copolymerized. There was obtained a solution of the desired copolymer (A) having an N.V. of 60%, a G.C. of less than 1 and an $\overline{Mn}$ of 15,000 to be abbreviated as copolymer (A-9)].

REFERENTIAL EXAMPLE 10

Preparation of the fluoroolefin copolymer (A):

Referential Example 7 was repeated except that 380 g of HFP, 20 g of perfluorooctyl perfluorovinyl ether, 100 g of EVE, 400 g of vinyl cyclohexanecarboxylate and 100 g of tris(methylethyliminoxy)silylpropyl vinyl ether were used as the monomers to be copolymerized. There was obtained a solution of the desired copolymer (A) having an N.V. of 60%, a G.C. of less than 1 and an $\overline{Mn}$ of 12,000 [to be abbreviated as copolymer (A-10)].

REFERENTIAL EXAMPLE 11

Preparation of the fluoroolefin copolymer (A):

Referential Example 7 was repeated except that 400 g of CTFE, 550 g of vinyl 2,2-dimethylpropanoate and 50 g of vinyltrimethoxysilane were used as the monomers to be copolymerized. There was obtained a solution of the desired copolymer (A) having an N.V. of 60%, a G.C. of less than 1 and an $\overline{Mn}$ of 18,000 [to be abbreviated as copolymer (A-11)].

REFERENTIAL EXAMPLE 12

Preparation of the fluoroolefin copolymer (A):

Referential Example 7 was repeated except that 500 g of CTFE, 300 g of CHVE, 150 g of EVE and 50 g of VSi were used as the monomers to be copolymerized. There was obtained a solution of the desired copolymer (A) having an N.V. of 60%, a G.C. of less than 1 and an $\overline{Mn}$ of 15,000 [to be abbreviated as copolymer (A-12)].

REFERENTIAL EXAMPLE 13

Preparation of the fluoroolefin copolymer (A):

Referential Example 7 was repeated except that 300 g of CTFE, 50 g of n-octyl vinyl ether, 100 g of EVE, 300 g of vinyl 2,2-dimethylpropanoate, 200 g of vinyl 3-chloro-2,2-dimethylpropanoate and 50 g of VSi were used as the monomers to be copolymerized. There was obtained a solution of the desired copolymer (A) having an N.V. of 60%, a G.C. of less than 1 and an $\overline{Mn}$ of 16,000 [to be abbreviated as copolymer (A-13)].

REFERENTIAL EXAMPLE 14

Preparation of a fluoroolefin copolymer free from a hydrolyzable silyl group:

A 2000 ml stainless steel autoclave was charged with 500 g of toluene and 500 g of MIBK, and cooled to −70° C. with a dry ice/methanol bath. The inside of the autoclave was purged with nitrogen gas. Liquefied CTFE (400 g) was introduced into the autoclave, and the mixture was heated to 60° C. A mixture composed of 400 g of VV-9, 150 g of methyl methacrylate (MMA), 50 g of betahydroxyethyl methacrylate and 20 g of azobisisovaleronitrile was added dropwise over the course of 4 hours. After the addition, the mixture was maintained at the same temperature for 15 hours to give a control copolymer solution having an N.V. of 50% and a hydroxyl value of 10.8 [to be abbreviated as copolymer (A'-1)].

REFERENTIAL EXAMPLE 15

Preparation of an acrylic copolymer containing a hydrolyzable silyl group:

A reactor equipped with a stirrer, a thermometer, a reflux condenser and a nitrogen inlet tube was charged with 400 g of toluene, 294 g of n-butanol and 6 parts of methyl ortho-formate, and in a nitrogen atmosphere, the temperature was elevated to 105° C. At this temperature, a mixture composed of 300 g of styrene, 400 g of MMA, 200 g of n-butyl acrylate, 100 g of gammamethacryloyloxypropyltrimethoxysilane, 10 g of azobisisobutyronitrile, 5 g of tert-butyl peroxybenzoate and 300 g of toluene was added dropwise over the course of 3 hours. After the addition, the mixture was maintained at the same temperature for 15 hours to give a control copolymer solution having an N.V. of 50% and a G.C. of less than 1 [to be abbreviated as copolymer (A'-2)]. This copolymer had a functional group concentration of 0.40 mole/1000 g of resin solids.

EXAMPLES 1–5 AND COMPARATIVE EXAMPLES 1–3

Fluoroolefin copolymers (A-1) to (A-4) obtained in Referential Examples 1–4 and copolymer (A'-1) or (A'-2) for control obtained in Referential Examples 14 and 15 were mixed with a curing catalyst, a curing agent or a pigment in the proportions indicated in Table 2 in a customary manner. Each of the mixtures was diluted to a sprayable viscosity with each of the diluting thinner shown in Table 2 to form a coating solution.

The coating solution was spray-coated on a steel plate having a thickness of 0.8 mm to a dry film thickness of 40 micrometers. The coated plate was air-dried by leaving it to stand for 1 week at 23° C., and used as a test specimen for an accelerated weatherability test.

In Example 5 and Comparative Example 3, a metallic base paint shown below was coated on the steel plate to a dry thickness of 20 micrometers, and after setting for 1 hour, the clear paint shown in Table 2 was coated and cured.

The metallic base paint was an acrylic urethane-type metallic base paint having a metallic powder concentration (or PWC) of 10% which was obtained by diluting a mixture of 100 parts of "Acrydic 44-127" (acrylic polyol made by Dainippon Ink and Chemicals, Inc.; N.V.=50%, hydroxyl value-32.5), 19.5 parts of "Burnock DN-950" (polyisocyanate resin made by the same company as above; N.V.=75%, isocyanate group content=12.5%), and 11 parts of an aluminum paste (N.V.=65%) with a diluting thinner composed of toluene, xylene and ethyl acetate in a weight ratio of 30:40:30 to a diluted viscosity, measured by the Ford cup #4, of 14 seconds.

The cured coated films obtained were subjected to the accelerated weatherability test, and the results are summarized in Table 2.

(*4): Thinner A: toluene/xylene/methyl isobutyl ketone/methyl ethyl ketone/n-butanol/methyl ortho-formate=20/30/20/15/10/5; Thinner B: xylene/toluene/ethyl acetate/ n-butyl acetate/Cellosolve acetate=40/20/10/20/10; Thinner C: toluene/xylene/n-butanol/methyl isobutyl ketone/Cellosolve acetate/methyl ortho-formate=18/30/29/10/10/3 (all weight ratios).

(*5) In Example 5 and Comparative Example 3, the thicknesses of only the top coats (clear coats) are indicated.

(*6): Expressed by the retention (%) of gloss based on the initial gloss after the specimen was exposed for 6,000 hours to an accelerated weatherability tester (Q-UV Weathering Meter made by Q-Panel Company of U.S.A.). Higher gloss retentions show better weatherability. One cycle of this test consisted of ultraviolet irradiation at 70° C. for 8 hours and subsequent exposure to water vapor at 50° C. for 4 hours.

EXAMPLES 6–14

Copolymers (A-5) to (A-13) obtained in Referential Examples 5 to 13, a curing catalyst and a pigment were

TABLE 2

|  |  | Example | | | | | Comparative Example | | |
| --- | --- | --- | --- | --- | --- | --- | --- | --- | --- |
|  |  | 1 | 2 | 3 | 4 | 5 | 1 | 2 | 3 |
| Mixing | Copolymer (A-1) | 100 | — | — | — | 100 | — | — | — |
|  | Copolymer (A-2) | — | 100 | — | — | — | — | — | — |
|  | Copolymer (A-3) | — | — | 100 | — | — | — | — | — |
|  | Copolymer (A-4) | — | — | — | 100 | — | — | — | — |
|  | Copolymer (A'-1) | — | — | — | — | — | 100 | — | — |
|  | Copolymer (A'-2) | — | — | — | — | — | — | 100 | 100 |
|  | Curing catalyst (*1) | 0.4 | 0.4 | 0.4 | 0.4 | 0.4 | — | 0.5 | 0.5 |
|  | Curing agent (*2) | — | — | — | — | — | 3.8 | — | — |
|  | Pigment (*3) | 26.7 | 26.7 | 26.7 | 26.7 | — | 35.9 | 33.3 | — |
| Diluting thinner (*4) | | A | A | A | A | A | B | C | C |
| Film thickness(micrometers)(*5) | | 40 | 39 | 41 | 39 | 41 | 41 | 40 | 39 |
| Accelerated weatherability (*6) | | 92 | 91 | 93 | 92 | 90 | 35 | (Gloss lost) | (Gloss lost) |

Note to Table 2

(*1): Dibutyltin diacetate was added in a proportion of 1% based on the solids content of the copolymer.

(*2): Cyclic trimer of hexamethylene diisocyanate (NV=100%, isocyanate group content=21.3%)

(*3): Rutile-type titanium dioxide was mixed with the copolymer so as to provide a pigment solids concentration (PWC) of 40%. The mixing and kneading was carried out in a customary manner in a sand mill.

mixed in the proportions shown in Table 3 to give coating solutions as in Examples 1–5 and Comparative Examples 1–3.

Each of the coating solutions was coated and cured, and the cured coated films were subjected to the accelerated weatherability test, as in Examples 1–5 and Comparative Examples 1–3. The hardnesses of the coated films were also measured. The results are summarized in Table 3.

TABLE 3

|  |  | Example | | | | |
| --- | --- | --- | --- | --- | --- | --- |
|  |  | 6 | 7 | 8 | 9 | 10 |
| Mixing proportions (parts) | Copolymer (A-5) | 100 | — | — | — | — |
|  | Copolymer (A-6) | — | 100 | — | — | — |
|  | Copolymer (A-7) | — | — | 100 | — | — |
|  | Copolymer (A-8) | — | — | — | 100 | — |
|  | Copolymer (A-9) | — | — | — | — | 100 |
|  | Copolymer (A-10) | — | — | — | — | — |
|  | Copolymer (A-11) | — | — | — | — | — |
|  | Copolymer (A-12) | — | — | — | — | — |
|  | Copolymer (A-13) | — | — | — | — | — |
| Curing catalyst | Dibutyltin diacetate | 0.6 | — | — | 0.6 | — |
|  | Monobutyl phosphate | — | 0.6 | 0.6 | — | 0.6 |
| Rutile-type TiO$_2$ | | 40 | 40 | 40 | 40 | 40 |
| Diluting thinner | | A | A | A | A | A |
| Film thickness (micrometers) | | 40 | 40 | 39 | 41 | 40 |
| Pencil hardness | | H | H | F | H | H |
| Accelerated weatherability (*) | | 75 | 80 | 87 | 85 | 86 |

|  |  | Example | | | |
| --- | --- | --- | --- | --- | --- |
|  |  | 11 | 12 | 13 | 14 |
| Mixing | Copolymer (A-5) | — | — | — | — |

TABLE 3-continued

| | | | | | |
|---|---|---|---|---|---|
| proportions (parts) | Copolymer (A-6) | — | — | — | — |
| | Copolymer (A-7) | — | — | — | — |
| | Copolymer (A-8) | — | — | — | — |
| | Copolymer (A-9) | — | — | — | — |
| | Copolymer (A-10) | 100 | — | — | — |
| | Copolymer (A-11) | — | 100 | — | — |
| | Copolymer (A-12) | — | — | 100 | — |
| | Copolymer (A-13) | — | — | — | 100 |
| Curing catalyst | Dibutyltin diacetate | — | 0.6 | 0.6 | 0.6 |
| | Monobutyl phosphate | 0.6 | — | — | — |
| | Rutile-type TiO$_2$ | 40 | 40 | 40 | 40 |
| | Diluting thinner | A | A | A | A |
| | Film thickness (micrometers) | 39 | 40 | 40 | 41 |
| | Pencil hardness | 2H | 2H | H | F |
| | Accelerated weatherability (*) | 80 | 84 | 87 | 75 |

(*): See the note (*6) to Table 2

The results shown in Tables 2 and 3 demonstrate that the ordinary temperature-curable resin composition of this invention has very good weatherability.

What is claimed is:

1. An ordinary temperature-curable resin composition comprising
   (A) a hydrolyzable silyl group-containing copolymer obtained by polymerizing a monomeric mixture comprising (i) a fluoroalkyl perfluorovinyl ether having 1 to 8 carbon atoms in the alkyl moiety, a perfluoroalkyl perfluorovinyl ether having 1 to 8 carbon atoms in the alkyl moiety or a mixture thereof and (ii) a vinyl ester of a carboxylic acid, as essential components in the presence of (iii) a hydrolyzable silyl group-containing compound,
   (B) a curing catalyst, and
   (C) an organic solvent.

2. The composition of claim 1 wherein the copolymer (A) is obtained by using a hydrolyzable silyl group-containing vinyl monomer as the hydrolyzable silyl group-containing compound.

3. The composition of claim 1 wherein the copolymer (A) is obtained by using a hydrolyzable silyl group-containing chain transfer agent as the hydrolyzable silyl group-containing compound.

4. The composition of claim 1 wherein the copolymer (A) is obtained by using a mixture of a hydrolyzable silyl group-containing vinyl monomer and a hydrolyzable silyl group-containing chain transfer agent as the hydrolyzable silyl group-containing compound.

5. The composition of claim 1 wherein (ii) the vinyl ester of a carboxylic acid is at least one compound selected from the group consisting of vinyl esters of alicyclic carboxylic acids, vinyl esters of aromatic carboxylic acids, vinyl esters of aralkylcarboxylic acids and vinyl esters of aliphatic carboxylic acids having a C$_4$–C$_{17}$ tertiary alkyl group.

6. The composition of claim 1 wherein (ii) the vinyl ester of a carboxylic acid is at least one vinyl ester of an aliphatic carboxylic acid having a C$_4$–C$_{10}$ tertiary alkyl group selected from the group consisting of vinyl 2,2-dimethylpropanoate, vinyl 2,2-dimethylbutanoate, vinyl 2,2-dimethylpentanoate, vinyl 2,2-dimethylhexanoate, vinyl 2-ethyl-2-methylbutanoate, vinyl 2,2-diethylbutanoate, vinyl 2-ethyl-2-methylpentaoate, a vinyl ester of C$_9$ Versatic acid, a vinyl ester of C$_{10}$ Versatic acid, a vinyl ester of C$_{11}$ Versatic acid and vinyl 3-chloro-2,2-dimethylpropanoate.

7. The composition of claim 1 wherein (ii) the vinyl ester of a carboxylic acid is at least one vinyl ester of an alicyclic carboxylic acid selected from the group consisting of vinyl cyclohexanecarboxylate, vinyl methylcyclohexanecarboxylate, vinyl tert-butylcyclohexanecarboxylate and vinyl cyclopentanecarboxylate.

8. The composition of claim 1 wherein (ii) the vinyl ester of a carboxylic acid is vinyl benzoate, vinyl p-tert-butylbenzoate or a mixture thereof.

9. The composition of claim 2 or 4 wherein the hydrolyzable silyl group-containing vinyl monomer is a vinylsilane having a hydrolyzable silyl group, a vinyl ether having a hydrolyzable silyl group, or mixture thereof.

10. The composition of claim 9 wherein the hydrolyzable silyl group is an alkoxysilyl, alkenyloxysilyl or iminoxysilyl group.

11. The composition of claim 9 wherein the vinyl monomer comprises the vinylsilane having a hydrolyzable silyl group and is a vinyltrialkoxysilane, a vinyltris(alkoxyalkoxy)silane or mixture thereof.

12. The composition of claim 9 wherein the vinyl monomer comprises the vinyl ether having a hydrolyzable silyl group and a trialkoxysilylalkyl vinyl ether, a tris(alkoxyalkoxy)silylalkyl vinyl ether or mixture thereof.

13. The composition of claim 1, 2, 3 or 4 wherein the hydrolyzable silyl group is an alkoxysilyl, alkenyloxysilyl or iminoxysilyl group.

14. The composition of claim 1 wherein the organic solvent (C) is an alkyl alcohol having 1 to 4 carbon atoms in the alkyl moiety.

15. The composition of claim 1 wherein the organic solvent (C) comprises a trialkyl ortho-formate, a trialkyl orthoacetate or mixture thereof.

16. The composition of claim 1 wherein the organic solvent (C) comprises an epoxy group-containing silane coupling agent.

17. The composition of claim 1 wherein the organic solvent (C) comprises a tetraalkyl silicate, a partially hydrolyzed and condensed tetraalkyl silicate, a tetra(substituted)alkyl silicate, a partially hydrolyzed and condensed tetra(substituted)alkyl silicate or mixture thereof.

18. The composition of claim 1 wherein (i) comprises the fluoroalkyl perfluorovinyl ether having 1 to 8 carbon atoms in the alkyl moiety and is pentafluoropropyl perfluorovinyl ether.

19. The composition of claim 1 wherein (i) comprises the perfluoroalkyl perfluorovinyl ether having 1 to 8 carbon atoms in the alkyl moiety and is perfluoropropyl perfluorovinyl ether.

20. The composition of claim 1 wherein (i) comprises a mixture of a fluoroolefin with the fluoroalkyl perfluorovinyl ether, or the perfluoroalkyl perfluorovinyl ether or both the fluoroalkyl perfluorovinyl ether and the perfluoroalkyl perfluorovinyl ether.

21. The composition of claim 20 wherein the fluoroolefin is at least one compound selected from the group consisting of tetrafluoroethylene, chlorotrifluoroethylene, hexafluoropropylene, vinyl fluoride and vinylidene fluoride.

22. The composition of claim 1 wherein (ii) comprises a mixture of the vinyl ester of a carboxylic acid and a cycloalkyl vinyl ether.

23. The composition of claim 22 wherein the cycloalkyl vinyl ether is at least one compound selected from the group consisting of cyclopentyl vinyl ether, cyclohexyl vinyl ether and methylcyclohexyl vinyl ether.

24. The composition of claim 1 wherein (i) comprises trifluoromethyl trifluorovinyl ether.

25. The composition of claim 1 wherein (i) comprises heptafluoropropyl trifluorovinyl ether.

26. An ordinary temperature-curable resin composition comprising
(A) a hydrolyzable silyl group-containing copolymer obtained by polymerizing a monomeric mixture comprising (i) a fluoroalkyl perfluorovinyl ether having 1 to 8 carbon atoms in the alkyl moiety, a perfluoroalkyl perfluorovinyl ether having 1 to 8 carbon atoms in the alkyl moiety, or mixture thereof, (ii) a vinyl ester of a carboxylic acid, and (iii) a copolymerizable vinyl monomer as essential components in the presence of (iv) a hydrolyzable silyl group-containing compound,
(B) a curing catalyst, and
(C) an organic solvent.

27. The composition of claim 26 wherein the copolymerizable vinyl monomer (iii) is an alkyl vinyl ether having 1 to 8 carbon atoms in the alkyl moiety.

28. An ordinary temperature-curable resin composition comprising
(A) a hydrolyzable silyl group-containing copolymer obtained by polymerizing a monomeric mixture comprising (i) a fluoroolefin, a fluoroalkyl perfluorovinyl ether having 1 to 8 carbon atoms in the alkyl moiety, a perfluoroalkyl perfluorovinyl ether having 1 to 8 carbon atoms in the alkyl moiety or a mixture thereof, and (ii) a vinyl ester of a carboxylic acid or a mixture of said vinyl ester and a cycloalkyl vinyl ether, as essential components, in the presence of (iii) a hydrolyzable silyl group-containing compound,
(B) a curing catalyst, and
(C) an organic solvent.

29. An ordinary temperature curable resin composition comprising
(A) a hydrolyzable silyl group-containing copolymer obtained by polymerizing a monomeric mixture comprising (i) a fluoroolefin, (ii) a vinyl ester of a carboxylic acid, as essential components, in the presence of (iii) a hydrolyzable silyl group-containing compound,
(B) a curing catalyst, and
(C) an organic solvent.

30. An ordinary temperature-curable resin composition comprising
(A) a hydrolyzable silyl group-containing copolymer obtained by polymerizing a monomeric mixture comprising (i) a fluoroolefin, a fluoroalkyl perfluorovinyl ether having 1 to 8 carbon atoms in the alkyl moiety, a perfluoroalkyl perfluorovinyl ether having 1 to 8 carbon atoms in the alkyl moiety, or a mixture thereof, (ii) a vinyl ester of a carboxylic acid or a mixture of said vinyl ester and a cycloalkyl vinyl ether, and (iii) a copolymerizable vinyl monomer, as essential components, in the presence of (iv) a hydrolyzable silyl group-containing compound,
(B) a curing catalyst, and
(C) an organic solvent.

31. An ordinary temperature-curable resin composition comprising
(A) a hydrolyzable silyl group-containing copolymer obtained by polymerizing a monomeric mixture comprising (i) a fluorine-containing monomer selected from the group consisting of vinyl fluoride, vinylidene fluoride, trifluoroethylene, tetrafluoroethylene, chlorotrifluoroethylene, hexafluoropropylene, trifluoromethyl, trifluorovinyl ether and heptafluoropropyl trifluorovinyl ether, or mixtures thereof, (ii) a vinyl ester of a carboxylic acid selected from the group consisting of a vinyl ester of linear or branched aliphatic carboxylic acid, a vinyl ester of alicyclic carboxylic acid and a vinyl ester of aromatic carboxylic acid or a mixture of said vinyl ester and a cycloalkyl vinyl ether, and (iii) a hydrolyzable silyl group-containing compound,
(B) a curing catalyst, and
(C) an organic solvent.

* * * * *